April 22, 1924.

E. B. SHIVELY

GASOLINE METER

Filed July 17, 1920

1,491,496

Inventor
E. B. Shively.

By C. A. Snow & Co.
Attorney

Patented Apr. 22, 1924.

1,491,496

UNITED STATES PATENT OFFICE.

EARL B. SHIVELY, OF CHICAGO, ILLINOIS.

GASOLINE METER.

Application filed July 17, 1920. Serial No. 397,032.

*To all whom it may concern:*

Be it known that I, EARL B. SHIVELY, a citizen of the United States, residing at Chicago, in the county of Cook and State of Illinois, have invented a new and useful Gasoline Meter, of which the following is a specification.

This invention relates to fluid measuring devices, and more particularly to a gasoline measuring device especially designed for use on motor vehicles for measuring the quantity of gasoline consumed by the vehicle, to which the same is applied.

The object of the invention is the provision of means to be installed in the gasoline pipe line, leading to the usual vacuum tank of a motor vehicle, to measure the gasoline on its passage to the vacuum tank.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
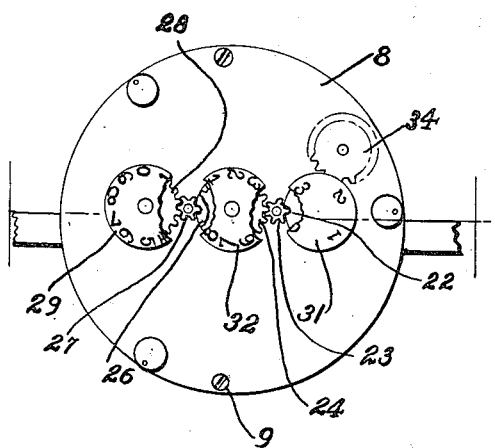
Figure 1 illustrates a plan view of a measuring device constructed in accordance with the present invention.
Figure 2:
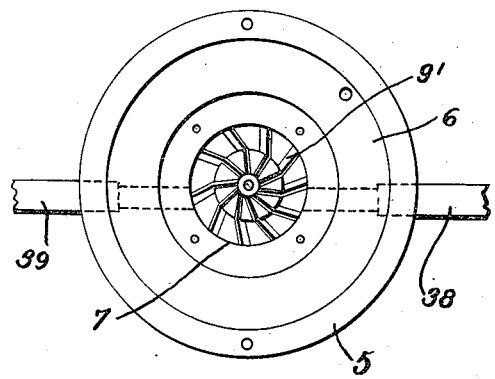
Figure 2 illustrates a view of the interior of the device, the cover thereof being removed.
Figure 3:
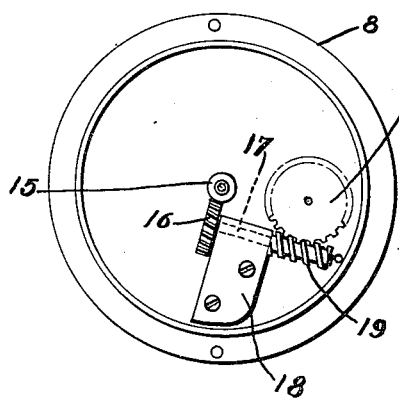
Figure 3 illustrates a bottom plan view of the cover.
Figure 4:
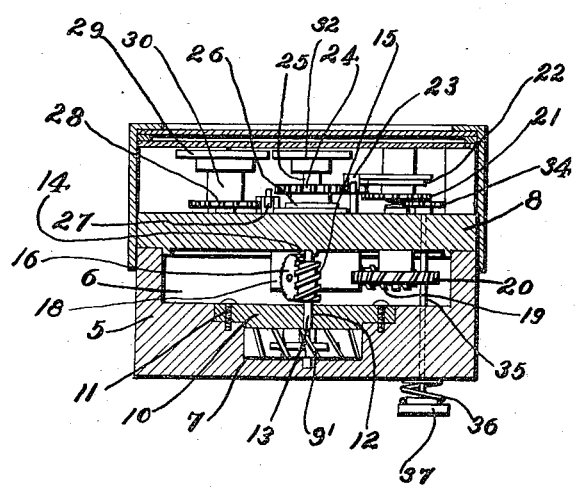
Figure 4 illustrates a sectional view through the device.

Referring to the drawing in detail, the reference character 5 designates the body portion of the device, which is hollowed out as at 6 and 7 to receive the gearing and propelling wheel respectively employed to operate the dials, to be hereinafter more fully described.

The cover is indicated by the reference character 8 and is secured to the body portion as by means of the screws 9 which pass through suitable openings in the cover and have the threaded portions thereof embedded in suitable openings formed in the body 5.

Operating within the hollowed out portion 7, is a propeller 9' which includes a plurality of curved blades of widths equal to the depth of the hollowed out portion 7, so that a fluid-tight connection between the edges of the blades and walls of the hollowed out portion 7 is insured at all times, to prevent the fluid from passing into the hollowed out portion 7.

This propeller 9' is held within the hollowed out portion 7 as by means of the plate 10, through which plate pass the securing screws 11 so that the plate is prevented from displacement, there being provided a central opening 12 formed in the plate to accommodate the shaft 13, on which the propeller 9' is supported the opposite end of the shaft 13 being disposed in a bearing indicated at 14 and which is formed integral with the cover 8.

Secured to the shaft 13 is a worm 15 which meshes with a pinion 16 mounted on one end of the shaft 17 that is carried on the underside of the cover 8, as by means of the bracket 18, there being provided a worm gear 19 on one extremity of the shaft 17, that meshes with the pinion 20, so that rotary movement of the pinion 19 imparts a rotary movement to the pinion 20 and its supporting shaft.

The upper end of the supporting shaft which supports the pinion 20, has secured thereto a pinion indicated at 21, above which pinion and disposed in spaced relation therewith, is a mutilated pinion 22 which contacts with the teeth of the relatively small pinion 23, so that every rotation of the mutilated pinion 22 will cause the pinion 23 to move a predetermined distance, with the result that the pinion 24 is also moved a predetermined distance, owing to its connection with the pinion 23.

The shaft 25 also supports a mutilated pinion 26 which is constantly in mesh with the pinion 27, which in turn meshes with the pinion 28 to cause the rotation thereof at predetermined intervals, with the result that the dial 29 carried at the upper end of the shaft 30, is also rotated.

Each of the shafts which supports the pinions carries a dial at the upper extremity thereof, which dials are moved at predetermined intervals by the operation of the mutilated gears, the mutilated gears being arranged so that the dial 31 must make one revolution to cause the dial 32 to move one point, and that one revolution of the dial 32 causes the dial 29 to move one point. Thus it will be seen that movement of the dial 31 causes the remaining dials to register accordingly.

In order that the dials may be reset, a resetting pinion indicated at 34 is provided on one end of the shaft 35, which shaft is normally held to the limit of its outward movement by means of the coiled spring 36, which is disposed between the bottom of the body portion 5 and the knurled head 37, thereby holding the pinions 34 out of mesh with the pinion 21, but if it is desired to reset the dials, the shaft 35 is forced inwardly which movement brings the pinion 34 into mesh with the pinion 21 so that rotary movement of the shaft 35 will cause the dials to move to their normal or initial positions.

It might be further stated that an intake pipe indicated at 38 has communication with the hollowed out portion 7 to feed gasoline through the propellor 9' while the outlet pipe 39 has communication with the gasoline or fluid passing through the device.

In the operation of the device, it is obvious that as fluid passes through the pipe 38, hollowed out portion 7, and pipe 39, the fluid passes over the propeller 9' with the result that the same is rotated, causing the remaining pinions and dials to be likewise rotated, to cause the dials to indicate the quantity of fuel passing through the body portion of the device.

Having thus described the invention, what is claimed as new is:—

In a fluid measuring device, a body portion having a hollowed out portion, a plate disposed within the hollowed out portion dividing the hollowed out portion into a propeller chamber and a gear chamber, a cover for the body portion and adapted to close the hollowed out portion, a shaft extending through the plate and having one end thereof supported by the cover, a propeller supported on the shaft and disposed within the propeller chamber, a worm on one end of the shaft, a gear meshing with the worm, a shaft disposed within the gear chamber and secured to the cover, to support the gear, said last mentioned shaft carrying a worm on its opposite end, a pinion meshing with the last mentioned worm, indicating dials supported above the body portion and adapted to be rotated through the worms, and pinions upon rotation of the propeller, and manually controlled means for returning the dials to their original positions.

In testimony that I claim the foregoing as my own, I have hereto affixed my signature in the presence of two witnesses.

EARL B. SHIVELY.

Witnesses:
FRED J. LUNDQUIST,
LOTHER A. WITT.